INVENTORS
ROY M. MAGNUSON
TRAVER J. SMITH
ATTORNEY

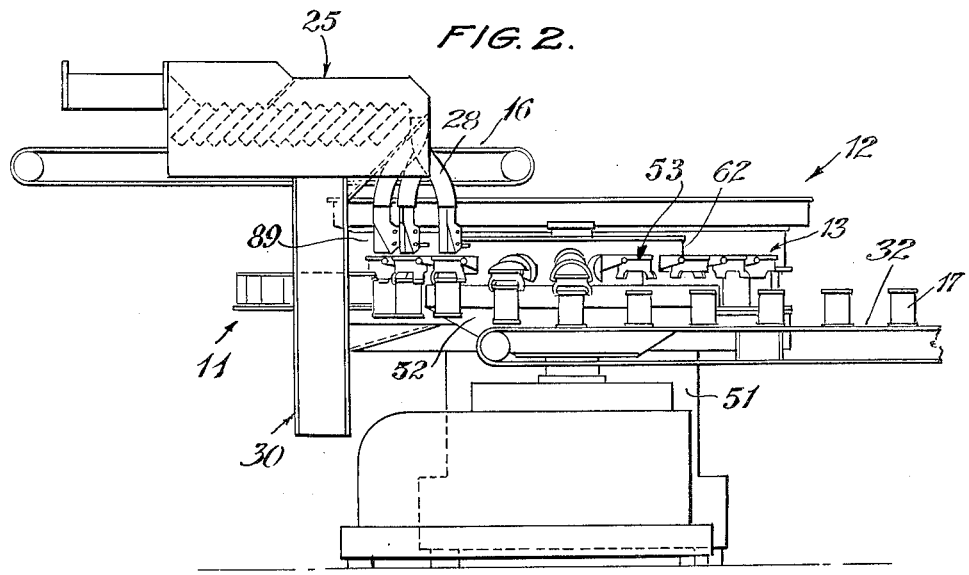
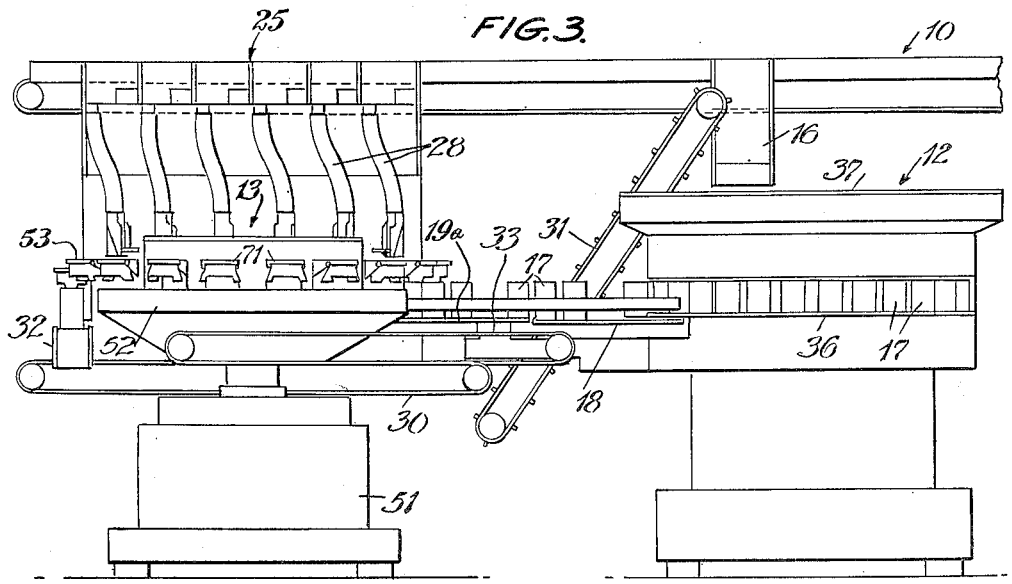

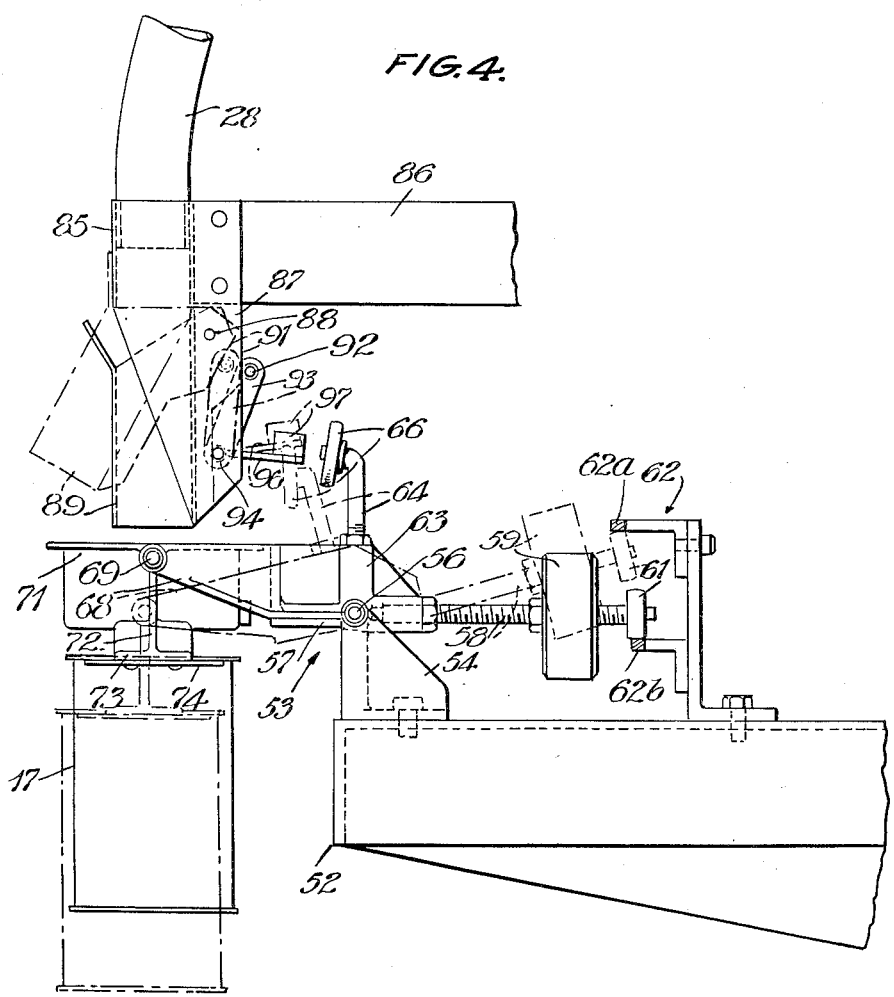
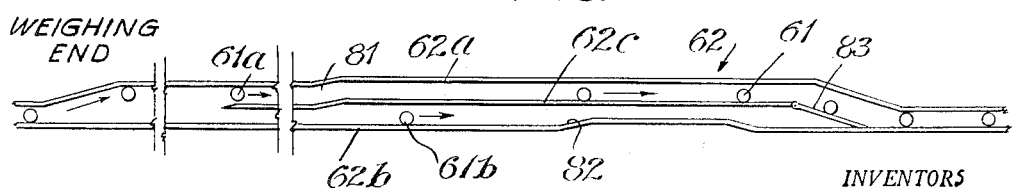

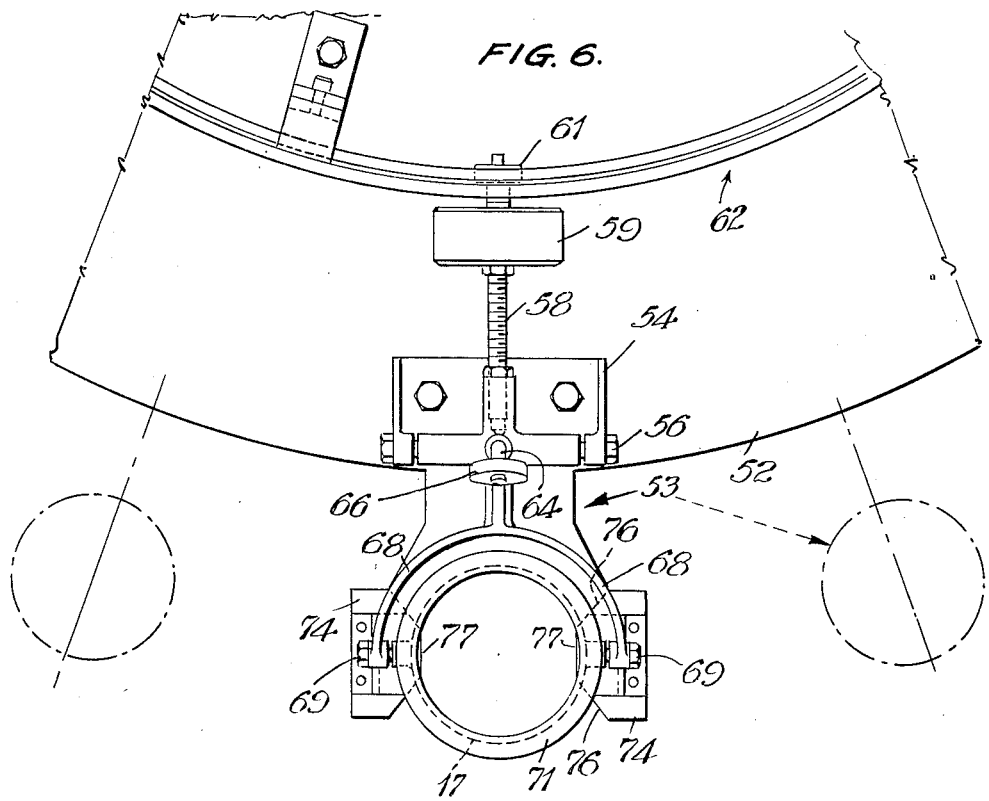
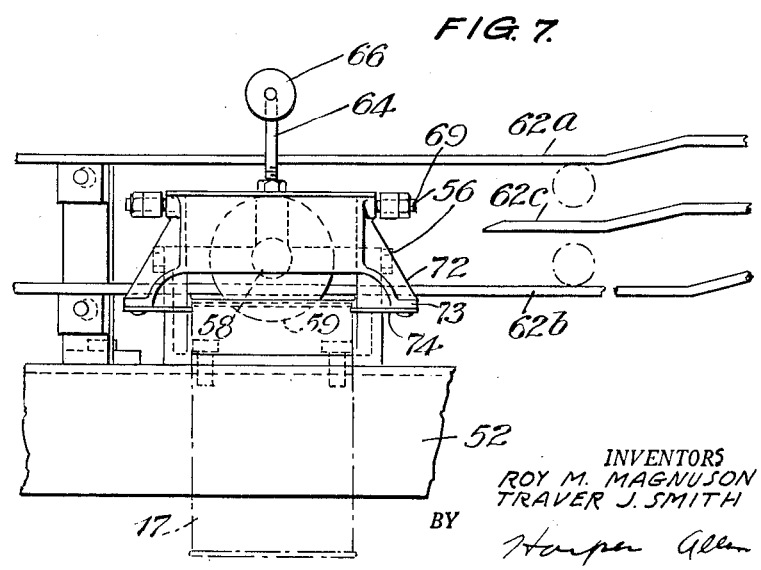

United States Patent Office 2,781,995
Patented Feb. 19, 1957

2,781,995

APPARATUS FOR WEIGHT FILLING OF CONTAINERS

Roy M. Magnuson, Campbell, and Traver J. Smith, San Jose, Calif.; said Smith assignor to said Magnuson Application April 13, 1951, Serial No. 220,933

4 Claims. (Cl. 249—59)

The present invention relates to the weight filling of containers with food articles, such as olives, prunes, and the like, where the weight of the material within the containers must necessarily be overweight by a part of the weight of one unit and where overweight filling in excess of the weight of one unit results in loss of yield in the packing operation.

It is the general object of the invention to provide improved apparatus for the weight filling of containers.

Another general object of the invention is to provide improved apparatus for the weight filling of containers whereby the containers are filled to the desired weight, i. e., within the weight range of a single unit.

Another object of the invention is to provide improved apparatus for weighing containers and their contents.

Other objects and advantages of the invention will be apparent from the following description of a preferred embodiment thereof as illustrated in the accompanying drawings, in which:

Figure 2 is a side elevational view looking from the bottom of the view shown in Figure 1, with certain parts also illustrated schematically;

Figure 3 is another side elevational view looking from the right of the view shown in Figure 1, certain parts also being illustrated schematically;

Figure 4 is a detail elevational view illustrating one of the weighing units in cooperative relation to the unit-by-unit discharge chute associated therewith;

Figure 5 is a developed view of the cam tracks for controlling the weighing units;

Figure 6 is a fragmentary plan view of a portion of the weight filling machine showing one weighing unit thereof; and Figure 7 is an elevational view of the weight filling unit shown in Figure 6.

Figure 1:
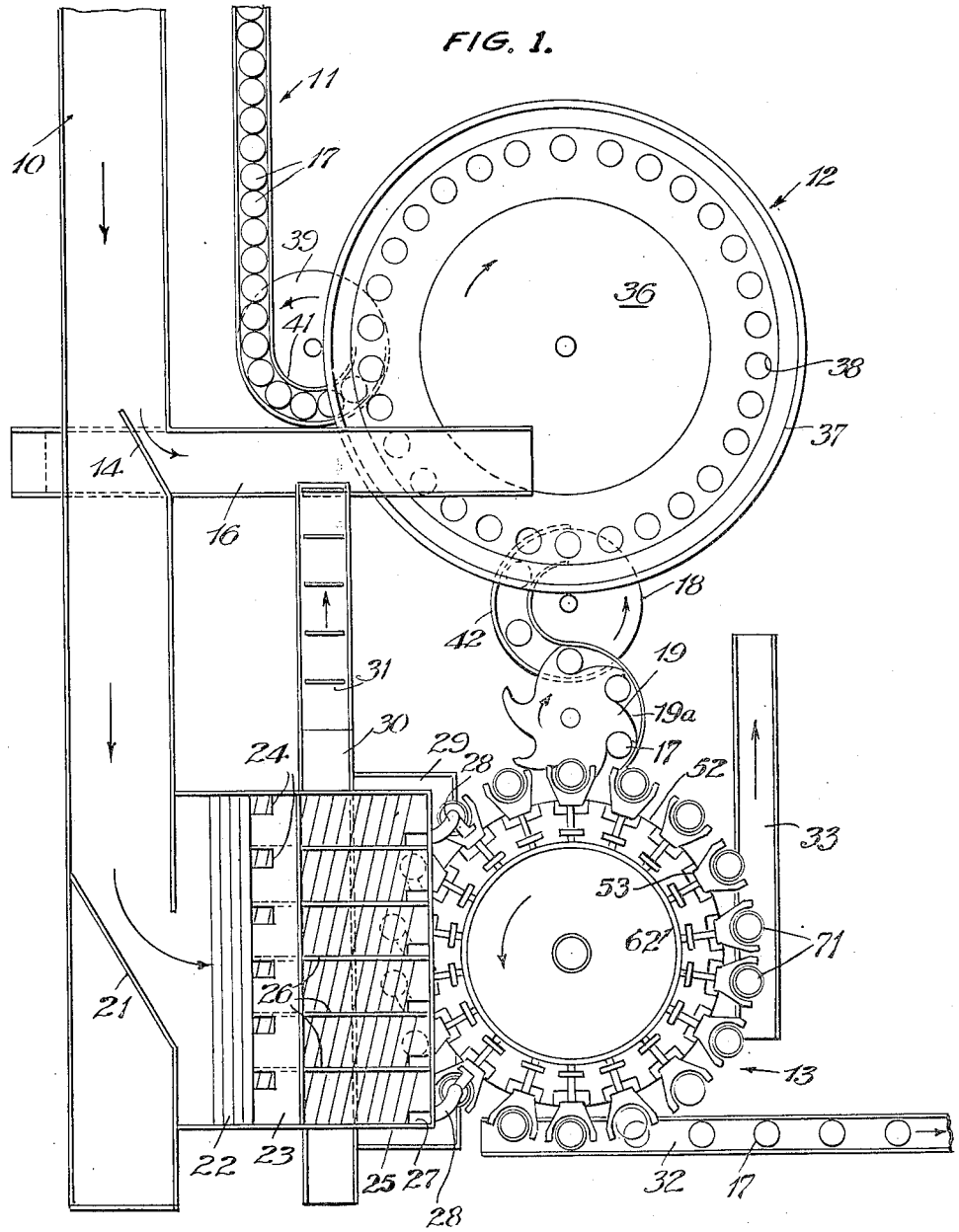
Figure 1 is a plan view of the weight filling apparatus with certain parts shown schematically.

The apparatus shown herein is particularly adapted for weight filling operations in carrying out the process disclosed and claimed in the co-pending application of Roy M. Magnuson, Serial No. 220,932, filed April 13, 1951, for Process of Weight Filling of Containers.

In general, the method of the above identified application comprises the establishing of a flow of the material to be filled as an indiscriminately arranged mass and in approximately the proper amount required with respect to a simultaneous flow of containers which are established in conjunction with the flow of material. The flow of material to be filled has a portion diverted to coincidence with the file of containers for underfilling of the containers to a desired degree, preferably within the weight of from 1 to 6 units of the material by weight. This diverted flow of the material is filled into the containers, for example, by hand filling operation, and the undiverted flow of material is carried into a single filing means where a plurality of parallel files of the units of the material are provided for a unit-by-unit feed into the partially filled containers. This unit-by-unit feed is positioned in an intersecting relation with respect to the path of movement of the containers in a final weight filling zone so that a unit from each of the parallel files can be placed successively in each container passing through this zone. The timing of the unit-by-unit feed of the individual parallel files is related to the timing of movement of the containers so that a series of containers is presented simultaneously to the discharge ends of these parallel files and each container may receive a unit of material therefrom. Preferably the single filing of the material or units of material into these individual files is accompanied by an excess flow of units from the discharge ends thereof and this excess is returned to join with the first diverted portion of the material in the preliminary underfilling operation.

As an underfilled container enters the weight filling zone, it is carried by a weighing unit so that as it receives an individual unit of material from the discharge end of each path of single file flow, its weight is increased by the weight of this unit and when the proper weight has been obtained in a container, subsequent discharges of the succeeding single file paths with respect to this container are diverted and returned with the excess flow from the single filing means to the underfilling portion of the apparatus.

Referring to Figures 1, 2, and 3, the apparatus there illustrated includes a belt-type material conveyor 10 and a belt-type can conveyor 11 which carry the respective flows of material and cans into the processing zones including an underweight filling zone in which a rotary hand type filler 12 is located and a unit-by-unit weight filling zone in which a weight type filling unit 13 is provided. A portion of the material carried on the conveyor 10 is diverted by a gate 14 to a transversely extending belt-type conveyor 16 which discharges into the center of the rotary hand filler 12.

The filler 12 is of conventional construction and consists of a rotary table 36 spaced below an upper hopper 37 which rotates therewith and is provided with a series of spaced apertures 38. The cans 17 are moved by the conveyor 11 between the guide rails 41 to the transfer disc 39 and they are placed in properly spaced relation on the table 36 beneath the apertures 38. The operator merely scoops material from the central portion of the hopper into the apertures 38 to cause a desired approximate amount of the material to fall into the aligned containers.

The cans 17 are underfilled by weight in the underfilling zone in which the rotary hand filler 12 is located. As the table 36 of this filler rotates the underfilled cans are brought to the rails 42 and guided thereby to the rotating transfer disc 18 which carries them to the star wheel 19 and the support plate 19a associated therewith. The star wheel 19 in turn moves each can 17 into proper aligned relation with respect to the associated weighing unit of the weight filling unit 13 as will be described hereinafter.

The portion of the unit material conveyed on the belt conveyor 10 which is not diverted by the gate 14 onto the conveyor 16, is carried by the conveyor 10 toward the gate 21 and is diverted by this gate 21 onto a first stage shuffle feed mechanism 22. The mechanism 22 has at its discharge end a barrier or wall 23 having a plurality of openings 24 therein through which the material is divided into a plurality of individual feeds and fed onto a second stage or single filing type shuffle feeder 25 which is divided into six parallel sections by partitions 26. The wall 23 is provided with six openings 24, one opening corresponding to each of the six parallel sections in the single filing feeder 25. Each of these parallel sections has the blades thereof positioned in the bottom thereof, inclined to the horizontal and angled transversely of the path of travel of the units of material. In their progress through these parallel sections said units of material are urged by these blades toward a side wall 26 of the respective parallel section and moved along this wall to the corresponding discharge opening 27 associated with the respective parallel section as described in detail of Patent No. 2,728,-443 for Shuffle Feed Mechanisms, issued December 27, 1955, to the assignee of the present application. The openings 27 are each of a size to pass a single individual unit of the material only. These openings provide exits from the lower right hand corners of these parallel sections, as shown in Figure 1, into flexible discharge chutes 28 shown in Figure 3.

The operation of the single filing shuffle feed mechanism is such that a timed unit-by-unit single file feed of the material is provided from each of these openings 27. Thus each time the shuffle-feed mechanism operates, a unit of the material is discharged from each of said openings at the ends of the six individual and parallel single filing sections.

The weight filling unit 13 (Figures 1, 2, and 3) comprises a base 51 on which a rotary turret 52 is journalled for constant rotation in the usual manner. This turret 52 is driven synchronously with the table 36 of the hand filler 12 in any convenient manner. A plurality of peripherally spaced weighing units 53, one of which is shown in detail in Figures 4, 6, and 7, are supported by U-shaped brackets 54 around the peripheral portion of the turret 52. Each U-shaped bracket 54 pivotally supports a pivot shaft 56 upon which a weight or scale lever 57 is mounted. An inwardly and radially projecting balance arm 58 is attached to the lever 57 and this arm is threaded to receive an adjustable weight 59 thereon. At its free end each arm 58 has journalled thereon a roller 61 for cooperation with a cam mechanism or track 62 referred to hereafter in greater detail.

Each lever 57 also includes an upwardly extending boss 63 into which there is threaded a shaft extension 64 carrying a control roller 66 on its horizontally bent upper portion. A bifurcated arm 68 is provided to the outer end of the scale lever 57 for the purpose of supporting the pivot studs 69 which engage the filling ring or collar 71 of the container support means. The collar 71 is provided with opposite downwardly extending can supporting arms 72 terminating in respective flat bottom pads 73 to which can lift plates or elements 74 are detachably secured. The collars 71 are disposed in outboard relation to the turret 52. As seen most clearly in Figure 6, the can lift plates 74 are provided with tapered inner edges 76 leading to spaced-apart can rim engaging lips 77 symmetrically disposed with respect to the tapered can guiding portion 76. The lips 77 are disposed directly beneath the respective pivot studs 69 for the collar 71.

As the turret 52 and the star wheel 19 are rotated with respect to each other, partially filled cans 17 are moved by said star wheel into position between the can engaging lips 77 of the weighing units 53 as these weighing units 53 are presented one after another to said star wheel. The partially filled cans 17 received by the weighing units 53 are carried by the turret 52 around to the unit-by-unit weight filling zone where the underfilled cans receive one or more units of material to fill them to or slightly in excess of the desired weight.

In the unit-by-unit weight filling zone, units of the material are discharged from the discharge ends of the single filing shuffle feed mechanisms in timed relation with respect to the operation of the shuffle feed mechanism so that the row of containers 17 presented to the said discharge ends will each receive one or more units of material from one or more of said discharge ends until the appropriate weight has been reached by each container. Thereafter subsequent single unit feeds are bypassed and the excess units of material do not enter the filled containers.

The excess material which is carried through these single filing sections to insure continuous single filing without interruption, passes onto a ramp 29 and a transverse belt-conveyor 30, as will be described hereinafter. The conveyor 30 discharges onto an elevating flight type conveyor 31 whose discharge end overlies the conveyor 16, so that the units of the excess material are added to the material supplied to the underfilling zone. Each of the weight filling units of the unit-by-unit weight filling mechanism 13 is tripped when an appropriate number of units have been added to the container carried thereby to exceed the desired net weight within the container. The subsequent discharges through the succeeding chutes 28 are then diverted onto the ramp 29 for return by the conveyor 31 to the underfilling zone as described above and for this purpose the chutes 28 are provided with suitable movable end members that will now be described.

Each flexible discharge chute 28 (Figure 4) is connected at its lower end to a collar 85 that is attached to a frame member 86 which has spaced-apart support plates 87 depending therefrom. Pivotally mounted at 88 in the respective plates 87 is a movable end chute member 89 having its discharge end positioned over the path of travel of the collars 71. Each member 89 has a rearward cam surface 91 associated with a pin 92 carried by a lever 93 that is pivotally supported in the plates 87 by the pivot 94. The lever 93 has an outwardly extending L-shaped arm 96 terminating in a cam end 97 that lies in the path of a roller 66 when the latter is moved to its dotted line position. From the above description, it will be seen that when a can 17 is underweight and the control roller 66 is in its full line position, shown in Figure 4, then the lower movable end portion or chute member 89 of the discharge chute 28 remains in alignment with the end of a related can weighing unit 53 so that a unit of the fruit or other article being filled will go into the can 17 aligned therewith. However, if a unit from one chute 28 fills the can to an overweight condition, the can weighing unit tilts rapidly to move the control roller 66 from its full line position in Figure 4 to its dotted line position so that it will engage the cam end 97 of the subsequent unit fill station and the chute member 89 thereof will be tilted from the position shown in full lines in Figure 4 to the dotted line position. As a result, the unit fed at the time the overweight container 17 is associated with this particular filling station will be discharged on to the ramp 29 rather than being placed in the container.

As a result of this operation, an underweight container will continue to receive a single unit feed as it passes each unit filling station until it becomes overweight and then the remaining unit feeds, with respect to this particular overweight container, will be diverted or bypassed back to the underweight filling zone and the can will receive no further units.

Referring again to Figures 1 and 4, the purpose and operation of the circular cam track 62 will now be described. This track controls the position of the can support means of the weighing units 53 in part, and, in part, the position thereof is responsive to the relative weight of the container 17 supported thereby. Referring to Figure 5, the cam track 62 includes an upper run 62a, a lower run 62b, and an intermediate run 62c for a portion of its periphery. At the extreme right of Figure 5 the upper run 62a is spaced with respect to the lower run 62b in the proper spaced-apart relation to confine the cam roller 61 and position the can lift or support plates 74 in a proper horizontal path with respect to the transfer star wheel 19 so that a can 17 is engaged with the opposed can lift plates 74 and left suspended thereon as said can leaves the support plate 19a associated with the star wheel 19 shown in Figure 1.

At the extreme left of Figure 5, the cans are leaving the can loading zone and are entering the can weighing zone, in which the runs 62a and 62b are spaced sufficiently far apart to allow the relative weights of the counterbalance weight 59 and the container 17 and its contents to control the position of the scale lever 57. In this portion of their travel the containers pass through the unit-by-unit feed under the discharge tube 28. Accordingly a can receiving the proper weight of material in the unit-by-unit feed zone, will tip the scale lever 57 to position the cam roller 61 as indicated at 61a in Figure 5 to be controlled by the cam runs 62a and 62c. The cam rise at 81 is sufficient to raise the cam roller 61 and lower the lift plates 74 to deposit a can, that is properly filled, on the conveyor 32, as seen in Figure 2, for example, the can leaving the lift plates in the manner of a gear tooth leaving an opposite gear. If a can does not receive the proper fill, the cam roller 61 associated therewith, continues on the lower run 62b as indicated at 61b, for example, and eventually arrives at a cam rise 82 when the container is overlying the conveyor 33, as seen most clearly in Figure 1, and the can lift plates 74 are lowered to deposit the underweight container on this conveyor. A pivoted gate 83 at the end of the cam run 62c allows the cam roller 61 to pass again into the common narrow control section of the opposed runs 62a and 62b at the right of Figure 5. Thus the containers which are filled to the desired weight are released from the weight filling mechanism onto the discharge conveyor 32 while containers which for one reason or another may still be underweight are carried past the conveyor 32 and discharged onto an underweight container discharge conveyor 33.

While we have shown and described a preferred embodiment of the invention, it will be understood that the invention is capable of variation and modification from the form shown so that its scope should be limited only by the scope of the claims appended hereto.

We claim:

1. In a weight filling machine, a base, a turret mounted for rotation thereon, a series of container weighing units carried by said turret, each unit comprising a scale lever pivotally mounted on said turret about an axis and including an inwardly projecting balance arm and an additional outwardly projecting arm, said additional arm being disposed in outboard relation to said turret, means attached to said additional arm for supporting a container, said container supporting means being disposed beyond the periphery of said turret, container feed means adjacent to a portion of the path of travel of said container supporting means, and container discharge means adjacent to another portion of said path.

2. In a weight filling machine, a base, a turret mounted for rotation thereon, a series of container weighing units carried by said turret, each said unit comprising a radially disposed scale lever and means for mounting said lever on said turret for pivotal movement about an axis transverse to the length of said lever, each said scale lever including a balance arm projecting inwardly from the axis of support of the scale lever and an additional arm attached to said scale lever and projecting outwardly from said axis, means for supporting a container pivotally mounted on the additional arm of each scale lever in a position outside the periphery of said turret, container feed means adjacent a part of said turret, and container discharge means adjacent another part of said turret.

3. A weight filling machine as described in claim 2 in which the container supporting means includes means for engaging the container adjacent the upper end thereof and supporting the container in depending relation.

4. In a weight filling machine, a base, a turret mounted for rotation thereon, a container weighing unit mounted in radially disposed position on said turret, each said unit comprising a scale lever, means pivotally mounting said scale lever on said turret about an axis, said scale lever including a balance arm projecting inwardly from said axis and an additional arm projecting outwardly from said axis and terminating beyond the periphery of said turret, said additional arm having container supporting means attached thereto and disposed beyond the periphery of said turret, and a container conveyor adjacent to a part of the path of travel of said container supporting means, said conveyor being responsive to the vertical positioning of said container supporting means with respect thereto for effecting transfer of a container therebetween.

References Cited in the file of this patent

UNITED STATES PATENTS

| | | |
|---|---|---|
| 720,008 | Doble | Feb. 10, 1903 |
| 968,749 | Duncan | Aug. 30, 1910 |
| 992,148 | Bates | May 16, 1911 |
| 1,300,274 | Jefferies | Apr. 15, 1919 |
| 1,713,575 | Warwick | May 21, 1929 |
| 2,137,334 | Dorrington | Nov. 22, 1938 |
| 2,186,471 | Beede | Jan. 9, 1940 |
| 2,198,788 | Popov | Apr. 30, 1940 |
| 2,451,534 | Christensen | Oct. 19, 1948 |
| 2,464,545 | Ahlburg | Mar. 15, 1949 |
| 2,496,019 | Peel | Jan. 31, 1950 |
| 2,502,380 | Howard | Mar. 28, 1950 |
| 2,603,443 | Miller | July 15, 1952 |

FOREIGN PATENTS

| | | |
|---|---|---|
| 501,117 | Great Britain | Feb. 21, 1939 |